United States Patent Office 2,696,708
Patented Dec. 14, 1954

2,696,708

JET ENGINE OPERATION

George D. Kittredge, Bartlesville, Okla., assignor to Phillips Petroleum Company, a corporation of Delaware No Drawing. Application May 25, 1953,
Serial No. 357,363

4 Claims. (Cl. 60—35.4)

This invention relates to jet engines. In one of its more specific aspects, it relates to a method of operating a jet engine with a minimum of carbon deposition. In another of its more specific aspects, it relates to a method for improving the operation of intermittent and continuous type jet engines. In another of its more specific aspects, it relates to an improved fuel for jet engines.

Jet engines, which may be generally classified as aerodynamic power plants, fall specifically into three distinct categories, i. e., ram jets, turbo-jets and pulse jets. The working cycle of the ram jet and the turbo-jet is essentially the same. One distinct difference in operation, however, is apparent in the compression step. Air is jammed into the combustion zone of the turbo-jet by a gas turbine. Compression in a ram jet engine is provided by the ramming effect of the oncoming air. Compression in the pulse jet engine is obtained by the ramming effect of the oncoming air and by the intermittent explosion of fuel which causes the closure of valves upstream of the combustion zone to prevent the escape of gases through the upstream end of the engine.

Fuel which is injected into the combustion zone of the above-designated jet engines may originally be ignited therein by a spark producing device, such as a conventional spark plug mounted in the wall of the combustion chamber. Additional fuel is thereafter ignited by the flame of burning fuel or by the heat from hot combustion gases remaining in the combustion zone or hot combustion chamber wall. The air and exhaust gases within the combustion zone are heated by the heat of combustion and are exhausted from the combustion zone through a rearwardly extending exhaust conduit at an exit velocity higher than the flying speed of the engine. The thrust produced thereby equals the gas mass flowing through the exhaust duct times its increase in speed, according to the law of momentum.

The deposition of carbon during the combustion of jet engine fuels has been a continuing problem in the operation of jet engines. The deposition of carbonaceous material in the combustion chamber of a particular engine is undesirable since the deposition of such carbonaceous material may either cause the formation of hot spots on the surface of the flame tube, and its quickened subsequent failure, or may disturb the air flow or fuel flow in the combustion system and thereby reduce the combustion efficiency of the engine. This problem of engine deterioration by reason of carbon deposition is particularly critical in the operation of turbo-jet engines. A conventional turbo-jet engine comprises three main parts. One of those parts is a compressor. In the compressor, kinetic energy is imparted to the air stream and is transformed in a diffusor into potential energy as measured by an increase in static pressure in the compressor. The second part, a combustor, is provided to receive incoming air and fuel which is burned therein to increase the temperature of the air and resulting combustion gases within the combustor. The third part, a turbine, is ordinarily provided downstream of the combustor and receives gases from the combustion chamber. The gas turbine unit in the turbine receives the gases from the combustor and develops only enough power to drive the compressor. When carbon forms in the combustion chamber, pieces of the carbonaceous material are sometimes dislodged from the surfaces in the combustion chamber and are blown into the blades of the high-speed turbine by the gases moving from the combustion chamber to the turbine, thereby causing damage to the turbine blades and resulting in malfunction of the turbine.

The objects of this invention will be obtained by the various aspects of the invention.

An object of the invention is to provide an improved fuel for use in jet engines so as to reduce carbon deposition therein. Another object of the invention is to provide an improved method of operating jet engines with a minimum of carbon formation. Other and further objects of the invention will be apparent upon study of the accompanying disclosure.

It was heretofore believed that hydrocarbons do not vary sufficiently in their burning characteristics to make a material difference in the operation of any jet engine. Such is not the case. Although some fuels may be burned under selected operating conditions with substantially no carbon deposition, other fuels may be clearly classified as carbon formers and, although they may otherwise be very acceptable for use in the operation of jet engines, the carbon deposition imposes the problems set forth hereinabove.

Broadly speaking, this invention resides in the use in a jet engine of a hydrocarbon fuel which contains a small amount of iron pentacarbonyl as a carbon formation inhibitor. The use of the iron pentacarbonyl in hydrocarbon fuels which would otherwise be of limited value because of the carbon deposition problem, permits the use of a broader range of materials in the operation of jet engines without encountering the problem of undue carbon deposition than is possible without the use of a carbon inhibitor.

I have discovered that the deposition of carbonaceous materials on vital parts of the combustion chamber of a jet engine, particularly of a continuous combustion type power plant, and more particularly in a fuel atomizing type combustion chamber, may be substantially reduced by adding to the fuel small amounts of iron pentacarbonyl as a carbon formation inhibitor. The use of the inhibitor permits an increasing utilization of aromatics and other hydrocarbons which normally result in considerable carbon deposition in the operation of jet engines. However, even the conventional petroleum hydrocarbon jet engine fuels, including kerosene and aviation gasoline, are improved by the addition of iron pentacarbonyl in an amount of between 0.05 and 1.0 volume per cent of the fuel. I prefer to use the iron pentacarbonyl in an amount within the range of between 0.1 and 0.5 volume per cent of the fuel. A preferred fuel comprises a hydrocarbon fraction containing normal paraffins and having a 95 per cent boiling point above 400° F. and containing the above designated portions of iron pentacarbonyl. As pointed out above, however, use of this carbon deposition inhibitor permits greater amounts of aromatics and will also permit a greater use of olefins than was heretofore deemed advisable.

Continuous type jet engines in which the fuel disclosed herein can be used include turbo-prop, turbo-jet, and ram jet engines, utilizing atomizing type system for supplying the fuel to the combustion chamber. Pulse jet engines are also benefitted by the utilization of such a fuel.

The above designated jet engine types may generally be operated by injecting a hydrocarbon fuel and air into the combustion zone of the jet engine at a fuel-air ratio between .005 and .10 and igniting the fuel so as to heat the air and combustion gases, thus increasing the volume of gas mass which is exhausted through the exhaust zone of the jet engine. Turbo-jet engines are preferably operated on a fuel-air ratio between .01 and .03. Ram jet and pulse jet engines are preferably operated at fuel-air ratios of from .03 to .07. In the operation of this invention, fuel and air are injected into the combustion zone of the engine at a fuel-air ratio between .005 and .10.

Understanding of this invention will be facilitated upon study of the following example which is not meant to unduly limit the invention but is instead presented for the purpose of exemplifying the advantages to be obtained by means of the invention.

EXAMPLE

A 2-inch diameter, fuel atomizing type combustion chamber was used in making the carbon deposition runs with the following operating conditions.

Air flow rate ........................ 0.040±0.001 lbs. per sec.
Fuel flow rate ....................... 1.8±0.04 lbs. per hour.
Fuel/air ratio ....................... 0.0125±0.0006.
Combustor inlet air temperature .. 100°±3° F.
Combustor inlet static pressure .. 60±0.1 in. Hg abs.
Duration of runs ..................... 1 hour.

A test hydrocarbon fuel having the following properties was used in making the runs.

Table

ASTM Distillation, °F.:
| | |
|---|---|
| IBP | 141 |
| 10% | 221 |
| 50% | 372 |
| 90% | 471 |
| EP | 524 |
| Reid Vapor Pressure, p. s. i. | 2.05 |
| API gravity | 47.6 |
| Sulfur, weight per cent | 0.1231 |
| Bromine number | 4.8 |
| Air Jet Gum @ 400° F., mg./100 ml | 31.3 |
| Steam Jet Gum @ 450° F., mg./100 ml | 5.7 |
| Freezing point, °F | <−80 |

One control run was made with this fuel containing no iron pentacarbonyl. This run resulted in the deposition of carbon on the flame tube at a rate of 856 milligrams per hour. A second portion of the same fuel, modified by the addition thereto of 0.1 volume per cent of iron pentacarbonyl, was utilized in a second run under the same operating conditions and resulted in a decrease in carbon deposition to 315 milligrams per hour.

Various modifications of this invention will be apparent to those skilled in the art. Such modifications are believed to be within the spirit and the scope of this invention.

I claim:
1. The method of operating a jet engine which comprises supplying to the combustion zone of said jet engine a hydrocarbon fuel containing between 0.05 and 1.0 per cent by volume of iron pentacarbonyl; burning said fuel in the combustion zone of said engine; and exhausting resulting gases from said engine so as to impart thrust thereto.

2. The method of operating a jet engine which comprises supplying to the combustion zone of said jet engine a hydrocarbon fuel containing between 0.1 and 0.5 per cent by volume of iron pentacarbonyl; burning said fuel in the combustion zone of said engine; and exhausting resulting gases from said engine so as to impart thrust thereto.

3. A fuel for use in a jet engine at a fuel-air ratio between .005 and .10 so as to deposit a minimum of carbon therein, which consists essentially of a normally liquid hydrocarbon fuel having a 95 per cent boiling point above 400° F.; and between 0.05 and 1.0 per cent by volume of iron pentacarbonyl.

4. A fuel for use in a jet engine at a fuel-air ratio between .005 and .10 so as to deposit a minimum of carbon therein, which consists essentially of a normally liquid hydrocarbon fuel having a 95 per cent boiling point above 400° F.; and between 0.1 and 0.5 per cent by volume of iron pentacarbonyl.

References Cited in the file of this patent

UNITED STATES PATENTS

| Number | Name | Date |
|---|---|---|
| 1,646,014 | Müller-Cunradi | Oct. 18, 1927 |
| 2,364,990 | Mallott | Dec. 12, 1944 |
| 2,560,542 | Bartleson et al. | July 17, 1951 |